(12) United States Patent
Catthoor et al.

(10) Patent No.: US 8,826,072 B2
(45) Date of Patent: Sep. 2, 2014

(54) METHOD AND SYSTEM FOR REAL-TIME ERROR MITIGATION

(75) Inventors: Francky Catthoor, Leuven (BE); Mohamed Sabry, Leuven (BE); Zhe Ma, Leuven (BE); David Atienza Alonso, Leuven (BE)

(73) Assignee: IMEC, Leuven (BE)

( * ) Notice: Subject to any disclaimer, the term of this patent is extended or adjusted under 35 U.S.C. 154(b) by 158 days.

(21) Appl. No.: 13/467,758

(22) Filed: May 9, 2012

(65) Prior Publication Data
US 2013/0305087 A1 Nov. 14, 2013

(51) Int. Cl.
*G06F 11/00* (2006.01)
*G06F 11/14* (2006.01)

(52) U.S. Cl.
CPC ............ *G06F 11/14* (2013.01); *G06F 11/1471* (2013.01)
USPC .............................. 714/15; 714/701; 709/219

(58) Field of Classification Search
CPC ..... G06F 11/14; G06F 11/1471; G06F 15/16; G06F 11/1446; H04L 2463/145
USPC ..................................... 714/15, 701; 709/219
See application file for complete search history.

(56) References Cited

U.S. PATENT DOCUMENTS

| 2008/0016393 | A1 | 1/2008 | Bose et al. | |
|---|---|---|---|---|
| 2009/0070552 | A1* | 3/2009 | Kanstein et al. | 712/29 |

FOREIGN PATENT DOCUMENTS

| WO | WO 2007/106959 A2 | | 9/2007 | |
|---|---|---|---|---|
| WO | WO 2007/106959 A2 | * | 9/2007 | G06F 15/80 |

OTHER PUBLICATIONS

Lee et al,, "Mitigating the Impact of Hardware Defects on Multimedia Applications—A Cross-Layer Approach", MM2008, Oct. 26-31, 2008, Vancouver, British Columbia, Canada.*
Fu et al., "Soft error vulnerability aware process variation mitigation", Proc. Int'l. Symp. on High-Perf. Comp. Arch. (HPCA), Bangalore, pp. 93-104, Jan. 2010.*
Doudalis et al., "HARE: hardware assisted reverse execution", Proc. Int'l Symp. on High-Perf.Comp. Arch. (HPCA), Bangalore, pp. 107-118, Jan. 2010.
Ma et al., "System-level analysis of soft error rates and mitigation trade-off explorations", Proc. Int'l, Reliability Physics Symp. (IRPS), Anaheim, CA, pp. 1014-1018, May 2010.
Lee et al., "Mitigating the Impact of Hardware Defects on Multimedia Applications—A Cross-Layer Approach", MM2008, Oct. 26-31, 2008, Vancouver, British Columbia, Canada.

(Continued)

*Primary Examiner* — John Trimmings
(74) *Attorney, Agent, or Firm* — Knobbe, Martens, Olson & Bear LLP

(57) ABSTRACT

A method of organizing on-chip data memory in an embedded system-on-chip platform whereon a deterministic application needs to meet a guaranteed constraint on its functional system behavior is disclosed. In one aspect, the method includes: a) dividing the deterministic application into blocks one of which corresponds to a part of a subtask of the application, the block receiving input data and/or generating output data and including internal intermediate data for transforming the input data into the output data, b) splitting the internal intermediate data into state and non-state data, and c) putting the non-state data and a part of the state data in a protected buffering module being part of the data memory and being provided with an error detection and correction module, so that they are available for mitigating the effect of faults on the functional system behavior on-line while meeting the at least one guaranteed constraint.

19 Claims, 5 Drawing Sheets

(a) Mechanism schematic diagram (b) Mechanism flow-chart

(56) References Cited

OTHER PUBLICATIONS

Lee, "Cooperative Cross-Layer Protection for Resource Constrained Mobile Multimedia Systems", University of California, Irvine, Thesis Dissertation submitted in partial satisfaction of the requirements for the degree of Doctor of Philosophy in Computer Science, Oct. 27, 2008.

Zhang, "Replication Cache: A Small Fully Associative Cache to Improve Data Cache Reliability", IEEE Transaction on Computers, vol. 54, No. 12, Dec. 2005, pp. 1547-1555.

Sabry et al., "A Hybrid HW-SW Approach for Intermittent Error Mitigation in Streaming-Based Embedded Systems" Design, Automation & Test in Europe Conference & Exhibition, Mar. 12-16, 2012, pp. 1110-1113.

Lee et al., "Partitioning Techniques for Partially Protected Caches in Resource-Constrained Embedded Systems", ACM Transactions on Design Automation of Electronic Systems, vol. 15, No. 4, Article 30, Sep. 2010, pp. 30.1 ~30.30.

Extended European Search Report for European Patent Application No. 12166151.6-1960 dated Mar. 6, 2013 by European Patent Office.

* cited by examiner (a) Aperiodic task graph    (b) Periodic task graph

|  |  | Clock cycles for L2 access | |
|---|---|---|---|
|  |  | 1 cycle | 2 cycles |
| Amount of L2 data stored/copied in L1 | All stream and state data | X | X |
|  | None | X |  |

|  |  | Strength of L1 data protection | |
|---|---|---|---|
|  |  | 1 error | 2 errors |
| Amount of L2 data protected | All (single error) | X |  |
|  | None | X | X |

(a) Mechanism schematic diagram  (b) Mechanism flow-chart

METHOD AND SYSTEM FOR REAL-TIME ERROR MITIGATION

BACKGROUND OF THE INVENTION

1. Field of the Invention

The disclosed technology relates to the field of mitigation techniques in systems prone to soft errors or data corruption of any other nature.

2. Description of the Related Technology

Modern technical systems such as household goods, DVD players, PCs, medical X-ray imaging, printers, advanced car vehicles and airplanes rely increasingly on intelligence realized with software running on embedded computing hardware. Embedded computer programs monitor the whole system and take care that the system accomplishes more than its parts would. In such software-intensive systems reliability is of prime importance. Complexity increase through increased feature integration, product life decrease and a trend towards increasingly open systems press a need for better development methods to ensure continued reliable products.

There is continuous pressure to improve the user-perceived functional reliability of such consumer electronic products, especially for streaming-type applications. This should result in minimizing the number of product failures exposed to the user. For most systems that are centralized and not consumer-related, this mitigation is quite well feasible, as the tolerated cost and performance (real-time, area and energy related) impact can be relatively major. In the consumer market, however, the cost-sensitivity and real-time nature prohibit this. Moreover, in portable systems also the battery life time is critical. So, also energy overhead should be reduced wherever possible. That context makes the functional reliability mitigation particularly challenging.

System-level soft errors occur when the data being processed is hit with a noise phenomenon, typically when the data is on a data bus. The system tries to interpret the noise as a data bit, which can cause errors in addressing or processing program code. A soft error will not damage a system's hardware; the only damage is to the data that is being processed. The bad data bit can even be saved in memory and cause problems at a later time. Software errors are most commonly known in semiconductor storage.

This disclosure however not only considers soft errors. It deals in general with data corruption of any nature affecting reliability. Other possible causes of transient and intermittent errors can be supply noise variation, temperature-induced variations, aging/degradation effects (due to e.g. bias temperature instability (BTI), time-dependent dielectric breakdown (TDDB) both in high-k devices and low-k wires, hot carrier injection (HCI), soft oxide breakdown (SBD), random telegraph noise (RTN), electro-migration in wires . . . ), etc.

A field wherein techniques for reducing impact on reliability are particularly relevant is that of real-time multi-media or wireless streaming applications. They form an important target market with a volume of hundreds of millions of chips per year. It can easily motivate a targeted domain-specific approach. The entire considered target application domain is much broader though, encompassing all applications with sufficient data storage (data or loop dominated processing) and exhibiting at least one design constraint (like real-time processing). This includes especially the multimedia, wireless, biomedical and automotive subdomains, but it is not limited to thereto. The reliability mitigation is especially crucial when IC feature size is shrunk to levels where such degradations and transient errors have a noticeable effect on the correct functional operation of embedded systems-on-chip (SoCs). That shrinking is essential to continue the necessary cost reduction for future consumer products. Several studies indicate that one is very close to such alarming levels for both aging related faults (e.g. BTI/RTN, HCI and TDDB below 20 nm) and Soft Errors (SE), even for more than single-event upset (SEU) disturbances. The largest impact of these SEs is clearly situated in the on-chip SRAM memories for storage of both data and instructions. Conventionally a fault rate of error occurrence per time unit is then defined. One is mainly interested in the impact on the system level outputs, so the fault rate is defined as the number of faults induced at the system-level outputs for a specified unit of time. That is typically based on a statistical model of the fault induced at the memory cell level. For the current technologies, the impact on individual registers and logic is still relatively low. The main concern for the SRAM storage relates to the functional requirements. Similar observations can be made for aging related effects due to BTI and so on. Also these mainly affect the on-chip memories.

Because of the area or performance overhead induced, many SoC developers for embedded markets then prefer to risk the impact of faults on their products. This leads however to failures during the life-time usage and to customer complaints. Traditional microprocessors are indeed quite vulnerable to such errors. Ignoring the failures also causes a large indirect cost on the producers. For soft errors that is not a desirable route, e.g. for the analysis of an automotive application. This motivates the search for schemes that are both safe and cost-effective. Several micro-architectural or software schemes with a potentially much smaller hardware overhead have been proposed. None of these existing approaches is really well suited for hard real-time systems where the performance and energy overhead at run-time has to be strictly controlled.

Several main options for mitigation can be identified in the prior art solutions: detection and correction of errors can basically be performed at hardware platform level, at middleware or micro-architectural level or at application level.

(On-Line) Error Detection and Correction at Hardware Platform Level

Most designers of embedded real-time systems traditionally rely on hardware to overcome the SRAM reliability threat. That typically involves error detection and correction codes (ECC). Such solutions meet in principle all constraints, but the hardware cost (area, energy, latency increase) is usually (too) high. That is especially so in case of distributed platforms, which are anyway necessary for energy-sensitive embedded systems. Hence, for energy- and cost-sensitive systems, these hardware schemes are not that attractive. In many cases manufacturers prefer to leave them largely out. In the best case they only protect part of their memory organization with the ECC hardware. Sometimes also hardware schemes are used that do not store the ECC redundancy codes in the same memory as the bits that are to be protected, to avoid modifications in the memory array. For instance, checksums are introduced with storage of the redundant information in separate locations, augmented with a hardware-supported protocol to protect the memories from soft error impact.

Also in the logic and register domain hardware schemes have been proposed to deal with functional failure correction (e.g. for soft errors). They modify the circuit to become more robust or they provide fault tolerance, e.g. by hardware sparing augmented with dynamic voltage scaling (DVS) to reduce the energy overhead, or they modify the scheduling, e.g. where the soft error rate of the registers in the processor is optimized. They are compatible with hard real-time system requirements, but these approaches are not suited to deal with memories. Either they are not applicable for that purpose or too high an overhead would be incurred.

(On-line) Error Detection and Correction at Middleware or Micro-Architectural Level This is relatively easily feasible when a QoS strategy is allowed. In the literature several schemes of this class have been described with a potentially much smaller hardware overhead. A good example is where a checkpointing mechanism is embedded in the code executed on the microprocessor pipeline. When an error is detected, recovery occurs by "relying on the natural redundancy of instruction-level parallel processors to repair the system so that it can still operate in a degraded performance mode". Obviously, that is only acceptable if the system is tolerant to such degradation. In "HARE: hardware assisted reverse execution" (I. Doudalis et al., Proc. Int'l. Symp. on High-Perf.Comp. Arch. (HPCA), Bangalore, pp. 107-118, January 2010) the checkpointing is assisted with hardware to reduce the overhead to about 3% on average. Even then much larger peaks can occur. In "Soft error vulnerability aware process variation mitigation" (X. Fu. et al., Proc. Intl. Symp. On High-Perf. Comp. Arch. (HPCA), Bangalore, pp. 93-104, January 2010) the focus lies on soft error mitigation for the registers in the processor by micro-architectural changes. Hence, it is important to fully meet functional and/or timing constraints. Then the incurred overhead will still be too high because it can come at the "wrong" moment just before a deadline. In that hard real-time case, it is only feasible when also the application level is exploited.

(On-line) Error Detection and Correction at Application Level

This starts from a deterministic fully defined algorithmic functionality between inputs and outputs. Although many "pure software" approaches have been proposed in the prior art, they all rely on the possibility to either degrade the functionality or on timing constraints not being fully guaranteed. In particular, they use some form of time redundancy or checkpointing to detect failures and a full rollback mechanism to recover. As a result, in prior art techniques the program tasks may be duplicated on an SMT (Simultaneous Multithreading) multi-core platform with some delay buffering, so that functional errors can be detected. If they occur, the software "works around the errors". In several pure software schemes based on source code transformations are applied. Another approach modifies the allocation and scheduling algorithm to introduce time redundancy in the synthesized or executed code. Changes in the mapping (especially allocation and scheduling) of the algorithm to the multi-core platform have also been proposed in order to make the execution more robust to failures.

It is clear that in such approaches both the detection and the correction at software level can take considerable cycle overhead once activated. That can also happen at the wrong moment in time, just before a hard deadline occurs. So they again assume a best-effort quality-of-service (QoS) approach, which is feasible for most microprocessor contexts.

In order to deal with failures prior art solutions have relied on the use of several checkpoints and rollback recovery. For example, a delayed commit and rollback mechanism has been proposed to overcome soft errors resulting from different sources such as noise margin violations and voltage emergency occurrence. Stored data are divided in the processor pipeline to two different states, noise-speculative and noise-verified states. Moreover, the solution relies on a violation detector that has a time lag (D) to detect a margin violation. If a data value is in noise-speculative state for a time period D and no violation is detected, it is considered as noise-verified (correct data). Otherwise, it is considered faulty and a rollback to the last verified checkpoint is performed, with flushing all noise-speculative states. This approach has a performance loss that reaches 18%, and the memories are considered as fault-tolerant, thus this technique cannot mitigate memory-based faults.

Some practical examples are now provided to illustrate the problems encountered in the prior art, that certain inventive aspects of this disclosure aim to solve. FIG. 1 represents a task graph of this simple illustrative example for mitigation. One assumes a task with three internal subtasks (blocks) with 400, 600 and 300 cycles, respectively, consuming 1300 cycles in total. The input data contains 16 words, the output data 24 words for each of the blocks in the task. The internally required task data amounts to 200 parameters (e.g. filter coefficients) per set and 520 data words. In the traditional mitigation approaches they both have to be fully protected by hardware ECC, which involves too much area and energy overhead. Alternatively, a software mitigation approach would be needed, which however would not fulfill the stringent timing requirements of a real-time application (see further motivation below).

In the above example the conventional hardware based mitigation reference would store everything in a single layer of two L2 memories, namely one for the parameters (L2P) and one for the data (L2D), e.g. L2P=400 words for two coefficient sets and L2D=520+16+24=560 words. Both of these L2 memories are fully equipped with detection and correction hardware, which leads to a relatively large area, access delay and access energy penalty. This is very hard to motivate in a cost-sensitive consumer application.

In order to avoid the costly hardware ECC protection, one can opt for a pure software scheme. In that case one needs checkpointing based on e.g. a duplication of the tasks (time redundancy) and when an error is detected, an appropriate rollback mechanism is activated. However, this approach takes a considerable cycle overhead and does not provide any guarantee that all the real-time deadlines be fully met. The program will also be extended, which costs some space in the external program memory. Depending on how that is implemented, also that cost can become relevant to consider.

A target application model is now described. Target applications split to different tasks $T_i$ (i=1, 2, . . . , k) can be represented by data flow graphs. FIG. 2 shows two examples of application task graphs, namely aperiodic (FIG. 2a) and periodic task graphs (FIG. 2b), where the tasks execution sequence is repeated every period. If the data generated from task $T_i$ is faulty, the recomputation of the affected data is a promising software-based solution. However, recomputation is a time consuming process for traditional mitigation approaches, implying significant timing and energy overheads. As a result, the quality-of-service (QoS) of the application is degraded significantly either by deadline violation to get error-free data or by discarding the erroneous data to maintain the timing constraint.

For example, consider that the application of the periodic task graph in FIG. 2b is running and let $T_{ij}$ denote, the execution of task $T_i$ at period j. Assuming that task $T_i$ consumes $N_i$ cycles to be completed and the data ($D_K$) generated in task $T_{ij}$ at cycle K (K∈[1,$N_i$]) is dependent on the data computed at cycles M, 1≤M<K. If $D_K$ is faulty and it is only detected at the end of the task execution (worst-case scenario) at cycle $N_i$, the whole task must be restarted, and another $N_i$ cycles are needed to recompute this data, which may lead to deadline violation of that task. FIG. 3 shows an example when task $T_{12}$ has an error. In this example, the recomputation of the whole task causes a large timing overhead that leads to deadline violation of this task. This example demonstrates that complete software-based mitigation techniques are inadequate with applications that do not have enough slack for a complete task rollback and recomputation.

The paper "*System-level analysis of soft error rates and mitigation trade-off explorations*" (Zhe Ma et al., Proc. Intl Reliability Physics Symp. (IRPS), Anaheim, Calif., pp. 1014-1018, May 2010) presents a system-level analysis of soft error rates based on a Transaction Level Model of a targeted system-on-chip. A transient error (e.g. soft error) analysis approach is proposed which allows accurately evaluating the use of selective protection of system-on-chip SRAM memory.

SUMMARY OF CERTAIN INVENTIVE ASPECTS

Certain inventive aspects relate to a mitigation solution for reliable embedded systems wherein an application has to meet a guaranteed constraint on its functional input/output behavior in terms of the 0/1 sequences that should be produced by its intended execution and wherein the amount of area and energy overhead is limited.

In a first aspect there is a method for organizing on-chip data memory in an embedded system-on-chip platform whereon a deterministic application is running, that has to meet at least one guaranteed constraint on its functional system behavior. The method comprises a) dividing the deterministic application into a plurality of blocks, at least one block corresponding to at least a part of a subtask of the deterministic application, the at least one block receiving input data and/or generating output data and comprising internal intermediate data for transforming the input data into the output data, b) splitting the internal intermediate data into state data and non-state data, the state data depending on previous internal intermediate data and non-state data being directly used inside the execution of one subtask, and c) putting the non-state data and at least a part of the state data in protected buffering module being part of the data memory, the protected buffering module provided with a module for error detection and correction, so that they are available for mitigating the effect of faults on the functional system behavior on-line while meeting the at least one guaranteed constraint.

A deterministic application is assumed to be present, i.e. an application without events that change the control/data flow graph structure at run-time (like events starting up new subtasks or ending them). The various subtasks of the deterministic application are first divided (possibly, grouped or split) into so called blocks. A block can be smaller than a subtask, i.e. correspond to only a part of a subtask, but may as well comprise two or more subtasks or parts thereof. A subtask (and consequently a block) receives input data and generates output data (or performs at least one of those functions) and comprises internal intermediate data. The intermediate data is split in each block into state data and non-state data. The state data depend on internal intermediate data of a previous block (or subtask). Non-state data is data directly used inside the execution of one block (subtask). This split is possible due to the fact that the application source code is assumed to be accessible. In a next step the non-state data and at least a part of the state data is put in protected buffering module that is part of the data memory architecture. The buffering module is provided with an error detection and correction mechanism. In that way, the data stored in the protected buffering module is always available for mitigating the effect of faults on the functional input-output system behavior on-line (in operation).

In one aspect the protected part of the state data at least comprises a portion of state data from which the other state data is derivable. That portion of the state data is referred to as essential state data. Storing only the part of state data that is essential contributes in limiting the size of the protected buffering module. The state data that is not protected can then be derived from the essential state data.

In one aspect the non-state data (i.e. the data with a relatively short lifetime) is split up in a plurality of data chunks. The data chunks have a size adapted to the size of the protected buffering module.

In one aspect the module for detection is activated not continuously, but only when data is actively read by the deterministic application (running on the platform) from the on-chip data memory. In this way, only errors are detected in data that is actually used.

In another aspect a step is performed of detecting and correcting an error in a data segment put in the protected buffering module.

In one aspect the error correction is performed when the data segment comprising the error is processed again. This demand-driven approach is advantageous in that useless operations are avoided as much as possible.

The on-chip data memory may be composed of several data memory layers and comprises a further memory part larger in storage size than the protected buffering module. The protected buffering module may be a smaller memory situated at the L1 layer, while a second, larger sized L2 memory is available as well. Each of these memory layers can group one or more separate memories.

The method according to one inventive aspect is advantageously applied when the deterministic application is a streaming application.

The on-chip data memory is preferably implemented as SRAM memory.

In one aspect the blocks comprise a number of checkpoints to indicate termination of a computation phase inside the block, the number of checkpoints being determined by optimizing the energy overhead due to storage in the protected buffering module and recomputation with area and time overhead as constraints. The size of the chunks of non-state data is derivable from the number of checkpoints.

In another aspect, when an error is detected, application execution is resumed from the last checkpoint that successfully terminated a computation phase.

In a second aspect there is a method for buffering streaming data in a deterministic streaming application running on an embedded system-on-chip platform, whereby the deterministic streaming application has to meet at least one guaranteed constraint on its functional system behavior. The method comprises a) dividing the deterministic streaming application into a plurality of blocks, at least one block corresponding to at least a part of a subtask of the deterministic streaming application, the at least one block receiving input data and/or generating output data and comprising internal intermediate data for transforming the input data into the output data, the received input data and/or the generated output data and at least a part of the intermediate data forming the streaming data, b) splitting the streaming data into data chunks, the size of the data chunks being selected so as to optimize the overhead cost of exploiting the splitting, c) storing the data chunks in the protected buffering module.

By storing only small data chunks a fault-tolerant memory buffer with minimal capacity can be implemented to enforce error-free operation and thus increase reliability. The buffer is used to protect a small portion of processed data used to restore the system from a run-time error.

In one aspect the data chunks have a size determined by optimizing the overhead cost due to storage in a protected buffering module and recomputation with area and time overhead as constraints. This optimization allows selecting the data chunk size so that energy overhead is minimized.

In one aspect the constraints are expressed as inequalities whereby area overhead and time overhead should not exceed a given allowed value.

The splitting into data chunks may be performed at checkpoints inserted into the execution of the streaming application, the checkpoints each indicating the termination of a computation phase in the block, the number of the checkpoints being determined in accordance with the size of the data chunks.

In one aspect application execution is resumed from the last checkpoint that successfully terminated a computation phase on detection of an error.

In another aspect there is an embedded system-on-chip platform comprising a hardware platform, with a processor and data memory, and middleware arranged for running on the hardware platform. The middleware ensures the mapping on the hardware platform of application software of a deterministic application, which has to meet at least one guaranteed constraint on its functional system behavior. The deterministic application is divided into a plurality of blocks, at least one block corresponding to at least a part of a subtask of the deterministic application, the at least one block receiving input data and/or generating output data and comprising internal intermediate data for transforming the input data into the output data, the internal intermediate data split into state data and non-state data, the state data depending on previous internal intermediate data and non-state data being directly used inside the execution of one subtask, wherein the data memory of the hardware platform comprises a protected buffering module with an error detection and correction mechanism. The hardware platform and the middleware are further adapted for putting the non-state data and at least a part of the state data in the protected buffering module, so that they are available for mitigating the effect of faults on the functional system behavior on-line while meeting the at least one guaranteed constraint.

In one aspect the data memory is organized in a plurality of hierarchical memory layers.

Certain objects and advantages of various inventive aspects have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

The invention will now be described further, by way of example, with reference to the accompanying drawings, wherein like reference numerals refer to like elements in the various figures, and in which.

DETAILED DESCRIPTION OF CERTAIN ILLUSTRATIVE EMBODIMENTS

Figure 1:
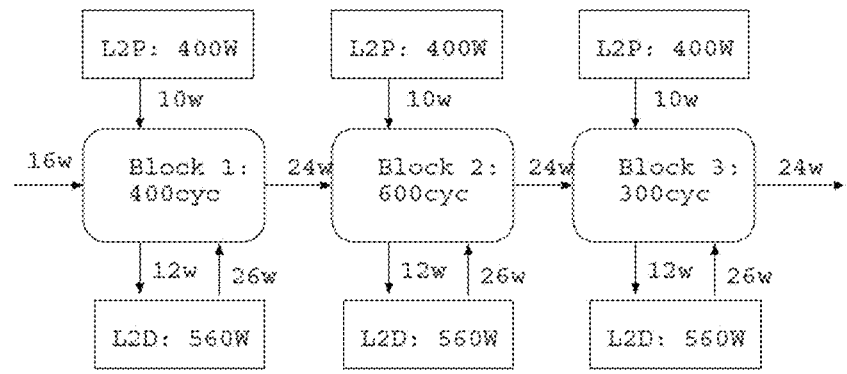
FIG. 1 illustrates a task graph of a simple example for mitigation.
Figure 2:
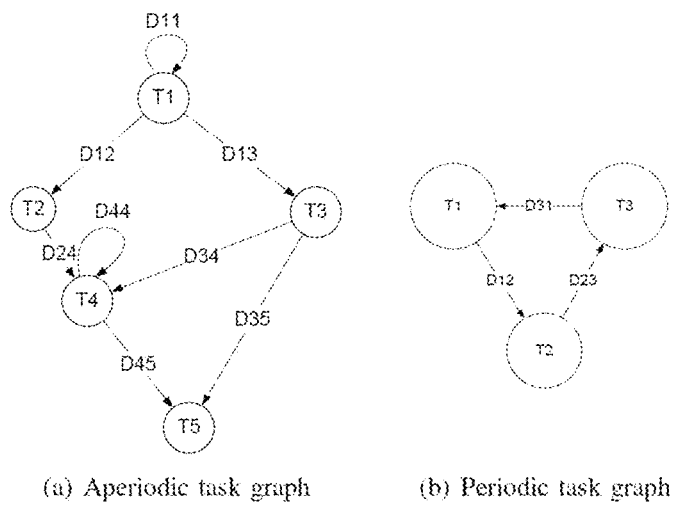
FIG. 2 represents some more task graphs: an aperiodic task graph in (a) and a periodic task graph in (b).

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Certain embodiments relate to mitigation solutions for reliable systems with given (known) software running on middleware and (multi-processor) hardware platform, where different solutions are characterized in terms of their cost versus failure rate and failure severity impact. The cost aspects are treated as different trade-off points in an N-dimensional space, e.g. area, memory footprint or energy. At least one hard constraint needs to be met, e.g. for fail-safe systems in terms of functionality (as in automotive) or hard real-time (as in many signal processing systems) or maximal temperature (for systems with hot spots). The hardware platform comprises the processor cores, the data and instruction memory organizations and the communication network. The middleware or system software contains the routines that are not application-specific and that are usually provided by the hardware platform vendor to enable an easier mapping of the application software on the hardware platform. That middleware is running on top of this hardware platform and together they form the 'complete' platform available to the application software provider.

Further, a deterministic application (of which the source code is accessible) is assumed where non-deterministic aspects are only situated 'outside' the system boundary. So, for example, soft errors seemingly coming 'out of the blue' but attributed to the platform where the application is running on, are allowed whereas non-deterministic random number generators inside the algorithm of the application itself are not. The application behavior can be data dependent but not event-driven. Hence, the structure of the application (and the tasks performed by the application) is analyzable at design time.

In embedded systems, and in particular in consumer electronics, these assumptions are valid. On the contrary, in general-purpose microprocessors, most users de facto see the hard constraints rather as "difficult trade-offs" (e.g. the system crashes once in a while) or they meet some hard constraints by putting the burden on the use (e.g. the system gives up because the temperature has become too high).

The problem to be solved in one embodiment concerns systems where data or instructions (stored in local memories) can be corrupted by various reasons (soft errors or degradation/aging effects). First the general solution principles are outlined. The case of a streaming application with some specific characteristics is considered as an example. An exploration is so provided of promising countermeasure/mitigation options to remove or alleviate the negative impact of (soft) errors.

A deterministic application is considered that in preferred embodiments is partly based on a streaming nature and loop or data dominated, i.e. quite some structured data are accessed in loop constructs. The application comprises subtasks, also called thread nodes (TNs) in the rest of this description. The TNs are typically comprised of loop code that is little or no data-dependent. Such application can be represented as a thread node graph (TNG). A TNG is a directed acyclic graph where each vertex is a thread node (TN) and each edge between two TNs represents a data transfer. Data-dependent constructs should be lifted to the control flow that is connecting the TNs into the application graph. They are mostly due to different modes which apply and that does or does not activate specific behavior. The modes typically depend on external information or situations. In addition, limited local conditional execution can be present which can remain inside the TNs as long as the execution paths are similar in length. Another requirement is that the TNs in an application graph are reasonably balanced in execution length. So, if very small TNs are present together with medium weight TNs, they are typically clustered. Heavyweight TNs should be further split up. The mostly streaming nature of the application also means that both between TNs and for the loop kernels inside the TNs, a vast majority of data can be assumed to have a relatively short life-time, when scheduled in a proper way. So it is possible to sequentialize the data writes and reads in such a way that they live very shortly and are mostly successively produced and consumed in a 'stream' manner. Only a few of the actual data (due to the non-streaming application part) are needed for a longer period and they can be considered as 'non-stream data'. The latter class can be further decomposed into some form of 'essential state data', and other non-stream data that are derivable from the essential state data. Note that also part of the stream data can depend on this state data. The approach according to one embodiment allows all these different cases encompassing both the streaming and non-streaming application parts.

For the memory architecture both larger (L2) and small (L1/L1') data memories are allocated on-chip, preferably with some level of direct or indirect program control. Note that the L1' data memory represents a protected part of the L1 memory. It can either be a reused part of the L1 memory or a small extra memory added to the original system. The proposed techniques can however also be applied to on- or off-chip caches with a pure hardware cache control, but then the overhead is larger. Scratch-pad SRAMs form a preferred implementation of the memories. The L2 memories have simple parity detection hardware, which signals potential errors in the memory partitions (granularity is selected based on error localization versus hardware cost trade-off). Error correction (ECC) hardware can however be left out. The L1 units have parity detection and the L1' units have both parity detection and error correction hardware up to the level where they are considered as sufficiently protected (trade-off between number of simultaneous errors that can be corrected and hardware cost). That is affordable because the L1' units are so small that the area overhead of the correction is nearly negligible.

Furthermore, the TN graph has to be available so that the TNs can be separately triggered, i.e. they are externally controllable, e.g. launched from the program counter of the processor and the executable start addresses for these TNs. If they cannot be triggered separately by means of hardware control, then the application designer would have to insert the check points between the TNs in the software code itself.

The TN graph dependencies are available and a default TN schedule is available for the platform. That is valid for the entire considered target application domain. The maximal address ranges for individual data structures/arrays are available from analysis of the executable (declarations). The actual number or reads and writes and the actually occupied address ranges for each data array are estimated from profiling. The number of execution cycles for each TN is available from profiling. The number of cycles for read and write access are available for each memory type (minimally for layer 2 (L2) and layer 1 (L1) memories separately).

First the main detector options are described. Run-time error detectors for memories are quite commonly used in hardware platforms. They are based on redundant codes. Typically these detectors can be very compact with a negligible area and performance overhead. Indeed, for detection simple memory parity check codes suffice that incur overheads of only 1 or 2 bits per stored data segment in the memory storage itself. The logic for the detectors is also negligible.

At higher levels, such as middleware and application level, the detection process becomes (much) more difficult to keep robust and complete. Moreover, it will start to induce considerable performance and energy overhead. Hence, the error detector is put at the hardware level close to the memories. Further, they are only activated when words are read from that memory.

For the on-line/run-time error correctors different abstraction layers can again be considered. However, now the complexity/cost versus accuracy/quality trade-off is completely opposite in passing through the levels. Run-time error correctors implemented in the hardware platform are based on redundant codes (often called error correcting codes in the literature). Typically these correctors require a significant area and performance overhead. Indeed, for correction multiple bits are needed, e.g. 8 bits added to every block of 64 bit. This leads to area overheads of 12% and more in the memories. Hence, the run-time mitigation and correction at the higher layers and in particular the middleware is potentially the most attractive solution. Putting them at the application software layer is considered too domain-specific and leads to a problem e.g. for a business model, which separates platform vendors from application providers. The middleware is considered to be part of the platform offered by the vendor so it is provided together with the actual hardware components of the platform. That is consistent with the business models applied by the platform vendors nowadays. The application software is then added on top of this by the users of the platform.

The TNs are grouped or split into 'blocks' that have a granularity which provides a good trade-off between recomputation overhead (data duplication) and delay overhead when mitigation is needed. The processing delay in the TN should preferably be larger than the memory access time to perform the recomputation of the corresponding data for a single block. Distinction is made between input data, output data and internally accessed block data (further referred to as 'internal block data'). For a general deterministic TNG one distinguishes for the internal block data between 'state data' and non-state data, based on whether these data have to be stored for more than a single time interval of the task execution (history-based, like a filter delay line or the stored input data of a convolutional coder) or not. The combination of input, output and internal non-state data is called 'temporary data'. By selecting the block size carefully (in the splitting/ grouping design step), the temporary data is also relatively small for each block activation. The temporary data becomes in this way small enough to be placed in the L1' layer, where it is fully protected.

When the TNG is fully of the streaming type, this can be simplified a bit further. For the internal block data one then distinguishes between 'stream data' (i.e. non-state data) and 'non-stream data' (the state data). The former is combined with the input and output stream data of the block and then these data streams are broken up further in small chunks (cfr. infra for more details). These chunks are small enough to be placed in the protected L11 layer, so the L2 access is not needed for that part. The non-stream data is dependent on previous sample inputs and hence has a 'history'. Also multiple read data of the streaming type will be allocated in that category, because it typically has a longer life time due to the spread of the multiple read accesses. That non-stream data cannot be directly stored in the small L1 memories, because its lifetime would be too long and hence the size constraint would be violated. By applying an appropriate background memory optimization on the application code, that size can however be reduced. Experience shows that this can always be effectively achieved in realistic cases. In particular, DTSE (=Data Transfer and Storage Exploration, or background memory management) techniques are very well matched to this objective. In that way a sufficient error protection is achieved while incurring negligible overhead in area, access latency and energy.

The history-based intermediate data, for generic (non-streaming) application is dependent on the intermediate data of the previous execution, while for streaming application is dependent on the intermediate data at the previous period.

State Data

Typically, only a small part of this state data (in the general case) or non-stream data (in the streaming case) is essential to compute the rest of the data, namely the "essential" state data. The essential state data is preferably reduced to the absolute minimal amount. Wherever feasible, algorithmic transformations are applied to reduce it further. Also the splits between the blocks are carefully selected to reduce the creation of unnecessary 'pseudo' state data between the blocks. If one cannot analyze which part is crucial, the worst case is assumed, namely that all state data needs to be protected. Typically that would however quickly lead to an unacceptable overhead. Fortunately, realistic applications do not behave that way.

For the essential state data in each block, a copy is provided in the protected buffer L1' from which one can compute the state data again, when needed. That state data normally comprises both the L1/L2 state data (the notation L1/L2 will be used when is meant the overall memory space represented by the combination of these 2 layers) and potentially some part of the data that is located in the register file(s) of the processor cores. In many cases, it is easier to keep that essential state data also as part of the memory space which is not protected to simplify the read addressing scheme. But if the latter is not a bottleneck, it is more area-effective when the essential state data is directly fetched from the protected buffer also in the normal fault-free application execution, so that only one copy is present in the system. If the block boundary would be cut at a location where the register files would contain relevant data, then it is indeed needed to include that in this state data. For a good application design and a proper choice of the block boundaries, that is normally not the case though and hence it is assumed that this can be avoided for practical experiments. The probability of both the original data word and its copy being corrupted is assumed sufficiently low to neglect it. If that would not yet be the case, one is forced to duplicate the state date more than once until the probability is low enough or one has to protect also the L2 sections that contain the duplicated state data. The latter is probably the cheapest solution still in practice.

Also all the input/output data for each TN is typically stored in small buffers for which it is hence needed to provide protection. Usually that input/output data is stored in L1' anyway and then the hardware correctors do the job. If not, one also needs to copy it explicitly in a backup (stored in the L2 address space). The size of the L1' buffer(s) can be kept very small by 'chunking' the streaming data (as detailed below), or in the general deterministic algorithms by dividing it in blocks having small temporary data sets. That heavily reduces the area overhead of the necessary ECC, to a negligible amount compared to the L2 sizes.

While proceeding with executing the TN graph, there is normally no error report of the parity detectors because functional errors are scarce, certainly in the normal life time of the IC. However, when some data needs to be accessed, it can happen that the parity detectors do report that a specific data partition is corrupted. That data is then labeled as unusable. It cannot be the streaming data (or the input data) because they are protected. Earlier streaming or input data from earlier executed blocks cannot be required anymore because of the streaming nature. If that corrupted data is the essential state data in its original (non-protected) storage location or a part thereof for the active block, then one just recopies it from the duplicate copy in the protected buffer. Of course, if the original storage was already protected no such recopying is needed. If it is other non-stream data within the active block, then recomputation is needed. The non-stream data (state data) are assumed to be copied in chunks from the L2 to the L1 memory layer. So, at least the entire chunk reported as corrupted, is recomputed. A similar principle applies for the blocks of temporary data.

One way out is to recompute the entire set of potentially corrupted (depending) data from the input data (potentially by first retrieving the backup copies of those inputs) and the copied state data. That involves a large overhead (many cycles, which may lead to a latency violation) but it has to be invested only once. One embodiment proposes another and normally more attractive solution, namely to act demand-driven (dynamically). That is most probably the best way for embedded systems, which are energy and latency sensitive. In that case, the data needed at a given point in the code is present in the L1 memories, either because it was stream data or because it has been copied from the L2 memories. Assume the corresponding parity detector indicates the corrupt nature of the original non-stream data from which the corrupt L1 info has been copied. Then, that specific data has to be recomputed. Note that at least a L1 chunk or block is recomputed though (see above). For that purpose, the corresponding essential state data (and potentially the input data) are copied from their backups. Then the data is recomputed. If somewhat later also another data chunk/block is potentially corrupt, one does not need to recopy the backup data, but only to recompute also that other data chunk/block, and so on.

In the worst case the demand-driven way still has some overhead because of more tests and book-keeping than the original code. But usually the demand-driven nature leads to only a small subset of the potential data to be recomputed. That is especially so in very dynamic code with control flow constructs like 'while' loops and conditions connecting the TNs. For nearly static codes, the one-time recomputation procedure is normally most suited. The stall-based delay introduced by this entire recomputation procedure can be large if the one-time recomputation procedure is used though.

That can give problems to guarantee the hard real-time nature. So in that case, it is also be better to spread out the penalty in the demand-driven way, at least when the execution of the code in the blocks allows it.

If the throughput reduction introduced by the demand-driven way is still not acceptable, then the throughput impact can be further reduced if some latency tolerance is present (which is usually the case for streaming applications). Then one can add an additional buffering between the different chunk/blocks and the user will not see a "local delay jump" in the output data production because all the data have been delayed compared to the input sampling. This chunk/block buffet implies some buffering overhead (storage and read/write accesses) and some extra processing cycles, but that extra cost and latency will be acceptable to meet the throughput related timing constraints.

Another direction for creating additional cost trade-offs is to investigate hybrid schemes that combine aspects of the two sides. So they are situated between the fully hardware protected L2 layer memory solution and the very limited protection (for correction) in the restricted L1 memory layer, as described above. Some of the L2 regions containing very sensitive data can indeed also be added in the protected buffers, at the cost of additional ECC hardware. Depending on the considered severity classes and the sensitivity of the different data/signals present in the application flow graph, a multitude of different working points can then be created. To evaluate all of these in the area—cycle count—energy—reliability impact trade-off space is impossible by hand. Hence, the designer needs a modeling and simulation tool to help with this large search space exploration.

Many hybrid schemes can hence be conceived. Below a number of relevant search space dimensions available to the designer are enumerated.

A first choice relates to whether all the L1/L2 layer memory space is left unprotected (no hardware error correction, only detection) or only part of it. The former choice saves hardware overhead but it increases the burden on the middleware mitigation techniques. Alternatively, the error rate can be increased at the application level.

Another degree of freedom relates to which stream data is removed from the combined L1/L2 space and only put in the L1 space. If more stream data is left in the L1/L2 space, they are not reproducible in case of a soft error and hence the soft error rate increases, while the required L1 overhead will go down (area and copy cycles). The extreme case is that nothing is put in the L1 layer (no additional memory hierarchy).

It also has to be decided which non-stream data (state data) are considered as essential state data. If data is left out from the worst case set, some of the TN data is reproducible in case of a reliability induced error and hence the system-level functional error rate increases, while the required L1 overhead goes down (area and copy cycles).

In one embodiment the essential data that should be protected in the L1 layer, are stored twice or thrice which leads to a protection based on redundancy (by copying or directly storing it during the write phase). Alternatively, that data is stored in specific regions of the L1/L2 layer where correction hardware is present. In the former case there can be cycle overhead for the copying or retrieval phase, in the latter case there is more protection hardware overhead.

One option is to protect all the L1 layer memory space. As another option only part of it is protected. The latter choice saves hardware overhead but it increases the system-level error rate at the application level.

Several types of detector code can be used: cheaper codes or more costly ones that can detect multiple system-level error occurrences in the same row. The same applies for the type of corrector code. Single correction codes are much cheaper but they still leave a non-negligible soft error rate at the application level.

The length of the rows in the individual memories for the detectors must be selected. The longer the rows, the less overhead bits (and area) are required. Less protection however increases the likelihood of multiple errors in that longer 'payload'.

Several options are available for transferring data between the different layers (processor-L1-L2): by direct memory access (DMA) engines, by the processor itself or by dedicated address generation units (AGUs). The DMA and AGU options increase the area overhead. When the processor assures the transfer, more cycle overhead is created.

Another design decision involves the amount of non-essential L1/L2 data space directly protected with correction hardware. With more protection the hardware overhead goes up but the software mitigation procedure needs to be called less often and the cycle overhead will hence increase.

Data can be corrected by the demand-driven software mitigation approach. One can build in a run-time filter that only activates the software mitigation when the latency impact is fully tolerable. The more that filter is activated, the higher the system-level error impact on the system level however.

Detectors can be activated only when data is read from the memory to the processor. Alternatively, also idle cycles can be used wherein the memory is not accessed to have the hardware go over the stored data. The latter option can heavily reduce the time to detect that a system-level error has occurred in a certain data region. It will not increase the cycle time assuming that the addresses to scan the memory rows are locally generated (by a linear sequencer) and not by the processor itself. However, it induces an energy penalty.

The data can be fully corrected demand-driven, i.e. only at the time it is actually needed to produce a new result. It is further also possible to correct them as soon as the detectors report an error. The choice between those two options can definitely make a difference in the amount of cycles needed to restore the data from the saved state: the earlier it is performed, the less overhead. The demand-driven way reduces the overall need to correct because data that is corrupted in a row but not yet needed immediately in the application, could well be corrected later on anyway due to another word that is needed from the same row, and that is read earlier. Many data can even become corrupted after the last time they were really needed by the application task and in that case the correction overhead is a total waste.

It is possible to change (the most time-critical part of) the L1/L2 memories to a multi-cycle read/write mode to allow a processor frequency increase. In that case, a further question is how many cycles are introduced. This leads to a reduced overall latency and a much easier software mitigation process. However, the scheduling becomes much more tricky, and hence a good scheduling tool support is required to help the designer in dealing with this.

The processor clock frequency can be improved by pipelining the data path or by transistor sizing and boosting the buffers. The former solution is simpler at the circuit level but increases the scheduling complexity (and potentially induces some cycle overhead). The former solution requires more design time by the circuit designers plus it induces an energy penalty.

Figures 3, 4, 5:
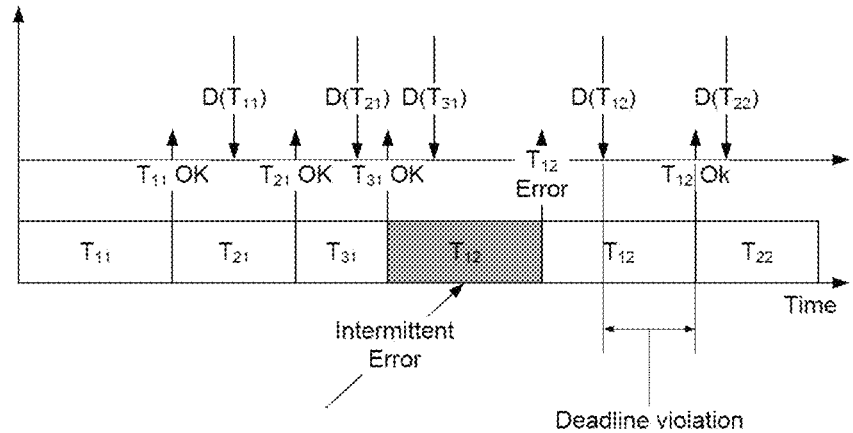
FIG. 3 represents an example of a periodic task execution with an introduced intermittent error.
FIG. 4 illustrates some mitigation options based on distribution of data over L1 and L2 layers.
FIG. 5 shows some mitigation options based on a protection scheme for data in L1 and L2 layers.

The above presented alternatives can obviously be combined in certain embodiments of the invention. However, certain combinations may be particularly attractive. Some graphical representations are now shown that visualize promising parts of the huge search space. In particular, FIG. 4 explores the dimensions directly related to the distribution of L1' and L1/L2 layer data, including the option to provide multiple clock cycles for the L1/L2 access. FIG. 5 explores the dimensions related to the type of error correction scheme used for the L1' and L1/L2 layer data, including the option to correct multiple errors in the L1' layer. In both of these exploration spaces, also the options that are the main variants typically explored for a test-vehicle, have been indicated in the figure with 'x'.

Figure 6:
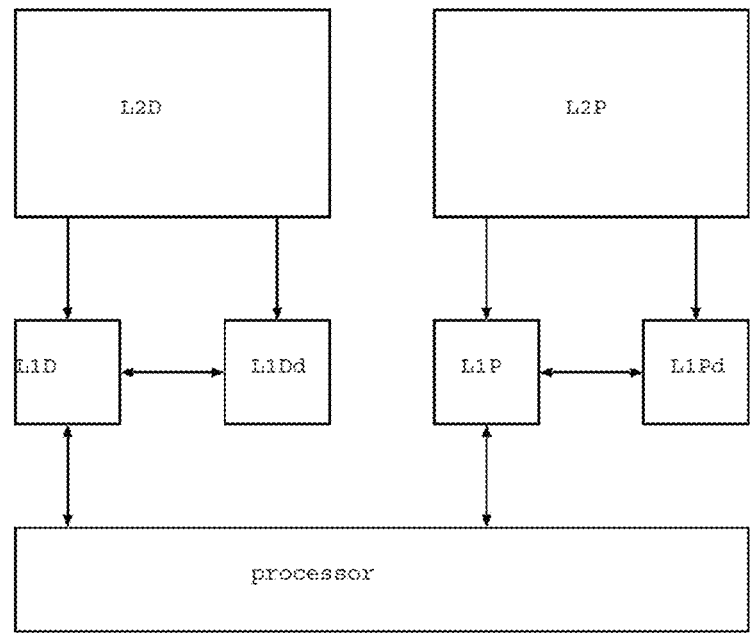
FIG. 6 illustrates a typical target hardware platform with initial memory layer L2D/L2P and an additional memory layer L1D/L1P, which has part of its data protected in the L1' memory partition.
Figure 7:
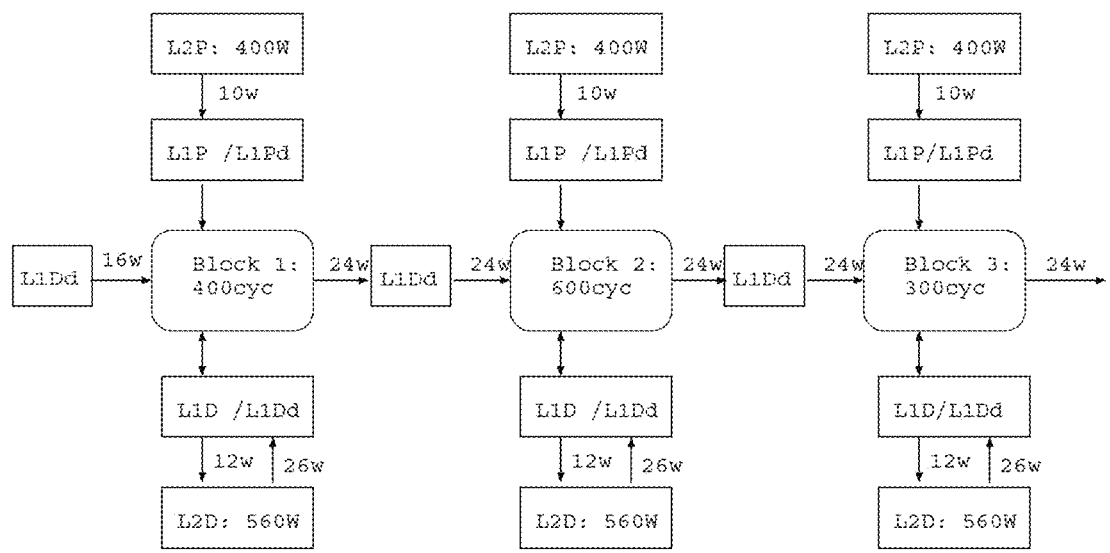
FIG. 7 illustrates the mapping of data and parameters to the protected memory.

The approach as set out above is now illustrated continuing with the small example already introduced before, wherein a task is assumed with three internal blocks with 400, 600 and 300 cycles, respectively, consuming 1300 cycles in total. The input data contains 16 words, the output data 24 words for each of the blocks in the task, so small enough to be buffered in the protected L1' layer memories (L1Dd and L1Pd), which are a subset of the conventional L1 layer memories. The global memory organization is depicted in FIG. 6, which describes the target platform wherein several data memory layers are present, where L1 and L2 layers may have separate memory banks for storing variables. The way the data and parameters are mapped to these memory layers and instances is shown in FIG. 7. The internally required task data amounts to 200 parameters (e.g. filter coefficients) per set and 520 data words; both are considered too large for full protection in the L1' layer. Hence, they are stored in a L2P (parameters) and L2D memory (data). These coefficients and data are assumed to be transferred from the L2 layer to the L1 layer (and from there to the processor) in 20 chunks (pieces of blocks) of 10 and 26 words, respectively. In addition for the data there is also a write phase from the processor to the L1 (and potentially also copied in the protected L1' layer) and then to the L2 layer which is based on 20 chunks of 12 words. It is also assumed that the 520 data words are composed of 260 streaming data and 260 non-stream data (cfr. infra for more details). The latter require a total of 50 'essential' state data by carefully selecting the slice positions between the blocks. For the parameters/coefficients, it is assumed that all of them are non-streaming and that they require 20 state data to produce them again. For the distribution over the three internal blocks, a ratio is assumed of 30, 40 and 30 of all these types of data and coefficients.

Note that a hardware ECC based solution would have everything stored in a single layer of two L1/L2 memories, e.g. L2P=400 words and L2D=560 words. Both memories are fully equipped with detection and correction hardware, leading to a relatively large area, access delay and access energy penalty. In the non-optimized case using the architecture with the L2 and L1 layers as described above, one would still need to protect both the L1 and L2 layer memories in order to avoid a negative impact of functional errors. Hence, this is more costly. However, due to the presence of the additional L1 layer (L1' layer) memories, a multi-cycle access time of the L2 memories can now quite easily be tolerated (by hiding the latency through prefetching in the single cycle access L1 layer). So in the example one has L1D and L1P memory spaces extra, which allows increasing the clock frequency, at least with a factor 2. Moreover, the data reuse can better be exploited if that is present in the code to reduce the number of accesses to the L2 layer (in the example this is not assumed). The introduction of the L1, layer hence mainly provides decreased execution latency (in seconds) due to the reduced clock cycle period. That correspondingly reduces the energy for the processor contribution. It also leads to a reduced memory related energy both in the dynamic part (data reuse exploitation) and especially the leakage (reduced latency), and this at the cost of somewhat more area due to the additional L1 layer which only needs to have small memory footprints.

Assume one has a TN with three internal blocks with 400, 600 and 300 cycles. That leads to the following schedule:
  read 16 words from L1D (input phase);
  read 20 chunks of 10 parameters from L2P copying through L1P;
  write 20 chunks of 12 data from L1D to L2D;
  read 20 chunks of 26 data from L2D to L1D;
  write 20 chunks of 24 data to L1D (output);
All the above chunks within each separate statement are sequentially executed, chunk by chunk. In addition, the dependencies of the reads and writes and the single port L1 memories that are available also lead to a mostly sequential execution of the memory accesses in the above order. The only concurrent transfer can happen between the parameters and the data accesses, because of the parallel L2 memories available there.

In the optimized case employing the hybrid hardware/software (HW/SW) countermeasure as described above, one still has the architecture with the L2 and L1 layers, but now only the L1 layer is fully protected and the L2 layer just has detection hardware. In normal operation the schedule is still nearly identical to the one above but one also has to duplicate some extra data storage. That will not lead to additional cycles if the memory is organized in such a way that the write accesses of the internal, input and output data can be routed also to the separate memory used for the duplicated storage (or to the separate memory port if that is considered cheaper, which is doubtful). These duplicated memories L1Pd and L1Dd (see FIG. 6) are labeled for the parameters and the data, respectively. Note that these can be fully separately implemented from L1P and L1D, or they can be merged in the same physical memory, which then has a protected and unprotected segment.

Assume now an error is detected in the third chunk of internal state data processed in the first block of the TN. That leads in a demand-driven way to the following schedule:
  read 2 words from L1D (input phase);
  read 2 chunks of 10 parameters from L2P copying through L1P;
  write 2 chunks of 12 data from L1D to L2D;
  read 2 chunks of 26 data from L2D to L1D;
  write 2 chunks of 24 data to L1D (output);
  read 1 word from L1D (input phase);
  read 1 chunk of 10 parameters from L2P copying through L1P;
  write 1 chunk of 12 data from L1D to L2D;
  restore 1 chunk of 50*0.3=15 essential state data from L1Dd for first block;
  recompute 1 chunk of 26 data and write to L1D and L2D at appropriate position;
  write 1 chunk of 24 data to L1D (output);
  read 17 words from L1D (input phase);
  read 17 chunks of 10 parameters from L2P copying through L1P;
  write 17 chunks of 12 data from L1D to L2D;
  read 17 chunks of 26 data from L2D to L1D;
  write 17 chunks of 24 data to L1D (output);
If the latency of the extra restore (e.g. for the essential state data is needed 50*0.3=15 cycles if the L1Dd layer has a 1 cycle access) and recompute phase (e.g. for one chunk of 26 internal data for TN1 at least 26 cycles are required to access each of them individually and perform some pipelined and parallel operations on them which do not increase the cycle count further because they can be 'hidden') would be too large in the overall computation time over the entire period. One can easily hide the access latency to the L1Dd memory by fetching it just in time for the processing to execute concurrently with it. Then the overhead is only 20 cycles for the overall recompute phase.

If the latency of the extra restore (e.g. 15 cycles for 1 cycle L1Dd layer) and recompute phase (e.g. 65*0.3=20 cycles) would be too large in the overall computation time over the entire period, one Can easily hide the access latency to the L1Dd memory by fetching it just in time for the processing to execute concurrently with it. Then the overhead is only 20 cycles.

If even that is considered too large for the throughput overhead (which is typically what counts most), then one can also add additional buffering (not shown in FIG. 7) and processing between the streaming blocks which introduces an extra latency. Then one can produce the following skewed schedule which has the same maximal throughput as the original one.
  read chunks for slot i;
  if some data is erroneous, correct it and overwrite it in buffer location
  for data i (does not cause throughput problem because the "normal" processing
    will happen in slot i-1);
  process chunks for slot i-1;
  write chunks for slot i-1;

In streaming-based applications data can be split in streaming (also referred to as non-state) data (input/output data) and non-streaming data (i.e. state data). The non-streaming data include all the intermediate data generated/consumed to transform the input to the output stream data. Moreover, non-stream data have interdependency on each other within a task life cycle (hence, between various time intervals of the task execution). This implies that a significant portion of non-stream data can be represented as a function of other non-stream data, which is referred to by "essential state data".

Essential state data ($\delta_{essential}$) can be defined as a non-stream data segment allowing the generation of any data segment ($\delta$) in the whole non-stream dataset ($\Phi$). The essential state data at least comprises a portion $\in$ of essential state data that are non-derivable from other data. The selection of $\delta_{essential}$ is dependent on many parameters, such as the granularity of the target application available data transactions.

In functional error mitigation $\delta_{essential}$ plays an important role when implementing a demand-driven mitigation mechanism. If a data segment ($\delta$) is corrupted within a task life cycle, $\delta_{essential}$ is used to compute the corrupted data segment. Thus, it is crucial to maintain $\delta_{essential}$ error-free throughout the whole task life cycle. One can maintain $\delta_{essential}$ error-free by placing a protected buffer in the memory hierarchy, which is tailored for $\delta_{essential}$ parameters.

In this respect $\delta_{essential}$ has additional constraints (besides the ones from the application behavior) on selecting its size. In particular, the area overhead of protected buffer and the time overhead required to correct any corrupted data segment are the two major additional constraints on selecting $\delta_{essential}$. If one selects $\delta_{essential}=\in$, then the buffer area overhead is small but at the cost of having a longer execution time. This long execution comes from the increased complexity of derivation of any segment of state data, as a specific data segment computation may require long functional re-evaluation of the task. On the other hand, full protection of the non-stream dataset requires a significant area overhead that may not be affordable in some cases, but the time overhead is almost negligible of mitigation as the data would never be corrupted.

Following, some further details are given on protecting the essential state data when mitigating errors. Within each task of the whole application, a copy of $\delta_{essential}$ is provided from which the outputs again can be recomputed, when needed. That state data normally comprises both the memory-stored state data and potentially some part of the data located in the processor core register file(s). When some data needs to be accessed, it can happen that the parity detectors report that a specific data partition is corrupted. Then that data is labeled as unusable. If that data is the copied state or input data for the active block, then one just recopies it from the original copy. Earlier input streaming data for earlier executed tasks cannot be required anymore because of the streaming nature. If it is other non-stream data within the active block than the state data, then a recomputation is needed. It is assumed that the non-stream data is copied in chunks from the memory layers. So, one recomputes at least the entire chunk which is reported as corrupt. In that case, the data that is needed is present in the highest memory level (e.g., L1), either because it was stream data or because it has been copied from lower memory levels. Assume the corresponding parity detector indicates the corrupt nature of the original non-stream data from which the L1 info has been copied. Then, that specific data has to be recomputed. Note that at least an L1 chunk is recomputed though. In the worst case, the demand-driven way has some overhead because there are more tests and book-keeping than the original code. But usually the demand-driven nature leads to only a small subset of the potential data to be recomputed.

As mentioned earlier, the essential data set ($\delta_{essential}$) at least comprises a portion $\in$ of essential state data that are non-derivable from other data. Thus, it is crucial to identify which data variables that belong to the minimal set $\in$.

The data variables belonging to this essential data set have a crucial impact to the whole system if they are erroneous. These variables are associated with long usage lifetime, recursive dependency, or read-only initialized constants.

Variables with long usage lifetime can be frequently updated or with less frequent update. For example, a data variable, which is updated every loop iteration, is frequently updated. If this variable becomes faulty in iteration (i), it is crucial to have a previously stored value from a relatively close iteration (i-k), in addition to the iteration counter at that instant (i-k).

Read-only constants should be protected throughout the whole application, as a fault in this data leads to an error that is not easily, or even not possible, recoverable. In this class of data variables, there can be ways of reconstructing the constants by reverse functioning the running task (e.g. inverse FFT for a FFT application). However, this technique may require tremendous instruction and timing overhead that puts in favor the protection the read-only constants.

Data Chunking

It was already mentioned various times in this description that data streams and specific parts of the non-streaming data are broken up in small chunks in order to keep the storage capacity at an acceptable level. Some aspects of this chunking are now discussed more in detail.

First some technical terms are explained in order to avoid any ambiguity. A checkpoint is a software-based trigger (CH(i)) that indicates the termination of certain computation phase in time and the commencement of another computation phase. At the end of each computation phase a checkpoint is committed if this phase is computationally correct. A data chunk is defined as the data segment ($D_{CH}(i)$) that is generated in computation phase(i) and/or should be alive between two consecutive computation phases (e.g. flow control registers, intermediate streaming data, . . . ). Data chunks are selected such that $D_{CH}(i)$ is the only data segment needed to compute $D_{CH}(i+1)$. Rollback is the process of restarting the system operation from the last successfully committed checkpoint.

The proposed methodology relies primarily on the insertion of a number of periodic checkpoints $N_{ch}$ within a task execution. At each checkpoint CH(i), with $i \in [1, N_{ch}]$, a data chunk is stored in a protected memory buffer that is integrated into the system. This buffer is referred to as L1'. When checkpoint CH(i) is being committed, data chunk $D_{CH}(i)$ is buffered to L1' to overwrite the previous data chunk $D_{CH}(i-1)$ while the task is being executed. However, if $D_{CH}(i)$ is faulty, it is regenerated using the error free $D_{CH}(i-1)$, starting from CH(i-1).

Figure 8:
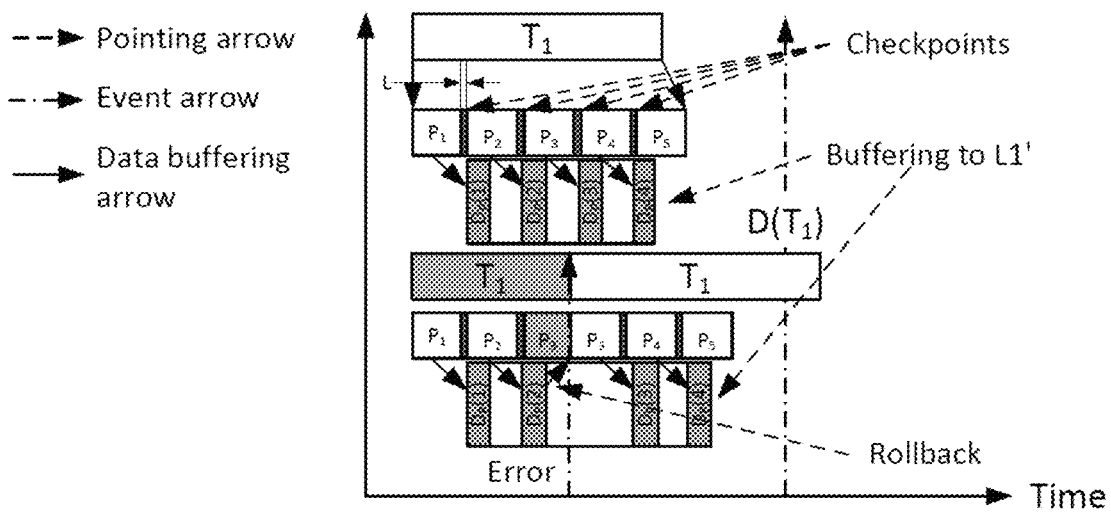
FIG. 8 represents an example of dividing the data of T1 into 5 phases showing the impact on intermittent error mitigation.

For illustration purposes, a certain computation task ($T_1$) is assumed that contains an iterative procedure. It is assumed that task $T_1$ corresponds to one 'block' of the application. It is further assumed that this iterative procedure is repeated 5.n times (i.e., the number of iterations is divisible by 5). Thus, one can split $T_1$ to five computation phases $P_i$, $i \in [1,5]$, as shown in FIG. 8. After each phase $P_i$, L cycles are elapsed in the checkpoint process and data chunk buffering. If the data is error free, the data chunk $D_P(i)$ is buffered while executing $P_{i+1}$. If an error occurs as in $P_3$, as shown in the example, only data chunk $D_P(3)$ is recomputed. Thus, the deadline violation previously occurred due to the introduced intermittent error is avoided in this case. However, in the case where no checkpoints are inserted, the execution of $T_1$ has to be restarted to mitigate from the same error, causing deadline violation.

As mentioned earlier, the proposed scheme involves a hybrid HW/SW mitigation mechanism that adds to the system additional HW modules and SW routines. An additional intermediate memory storage layer, namely L1', is integrated between the L1 and the processing unit. L1' has a multi-bit ECC circuitry that, due to the small L1' capacity, is extremely limited in size. L1' is used to buffer the chunk(s) at checkpoint CH(i), that are essential and sufficient to mitigate an error occurred between checkpoints CH(i) and CH(i+1).

The proposed HW/SW mitigation implementation technique is elaborated by splitting the overall mechanism into three major modules: Checkpoint routine, Error Detection mechanism, and Mitigation routine. These modules are design and implemented as follows.

Figure 9:
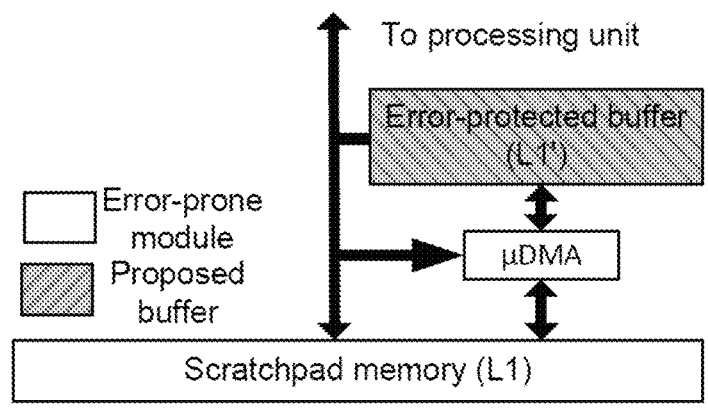
FIG. 9 represents a schematic diagram of the implemented μDMA module.

The checkpoint routine is used to trigger a computation phase termination. It is implemented as a software routine that controls the data buffering from the memory to the protected buffer. A call to this routine is injected in the task execution and it can be injected at the code compilation phase. For a specific application, application behavior is first studied using a control flow graph (CFG)-like representation. Based on this analysis, the possible checkpoint injection points can be detected. Then, based on the number of checkpoints required, at the desired injection points a call is placed to the checkpoint routine, which applies the algorithm shown in Algorithm 1. The algorithm takes the to-be-protected data address space, represented by a starting address and an offset, as an input. Then, the routine checks for errors in this memory range (with error detection circuitry). If an error is found, this routine is terminated by triggering another interrupt service routine (ISR), namely 'Mitigation routine'. If there are no errors in the selected data range, this routine stores the program counter (PC), along with other status register(s) to the protected buffer L1', then it sends the desired address range to a DMA-like module to enable the transfer between the memory module and the buffer. The DMA-like (referred to by μDMA) module is connecting the protected buffer (L1') to the L1 SRAM, as shown in FIG. 9. The μDMA module is accessible, from the processing unit, via a special address space. A customized DMA module may be used tailored to the target system.

---
Algorithm 1 Checkpoint(Start_address,Offset)
---
y = Check_Error(Start_address, Offset)
if y ≠ 0 then
   TRIGGER(Mitigation routine)
   Return −1
else
   L1'.PC_buffer ← Proc.PC
   μDMA.base_address ← Start_address
   μDMA.length ← Offset
   μDMA.transfer(L1, L1')
   Commit_checkpoint( )
   Return 1
end if

---

Figure 10:
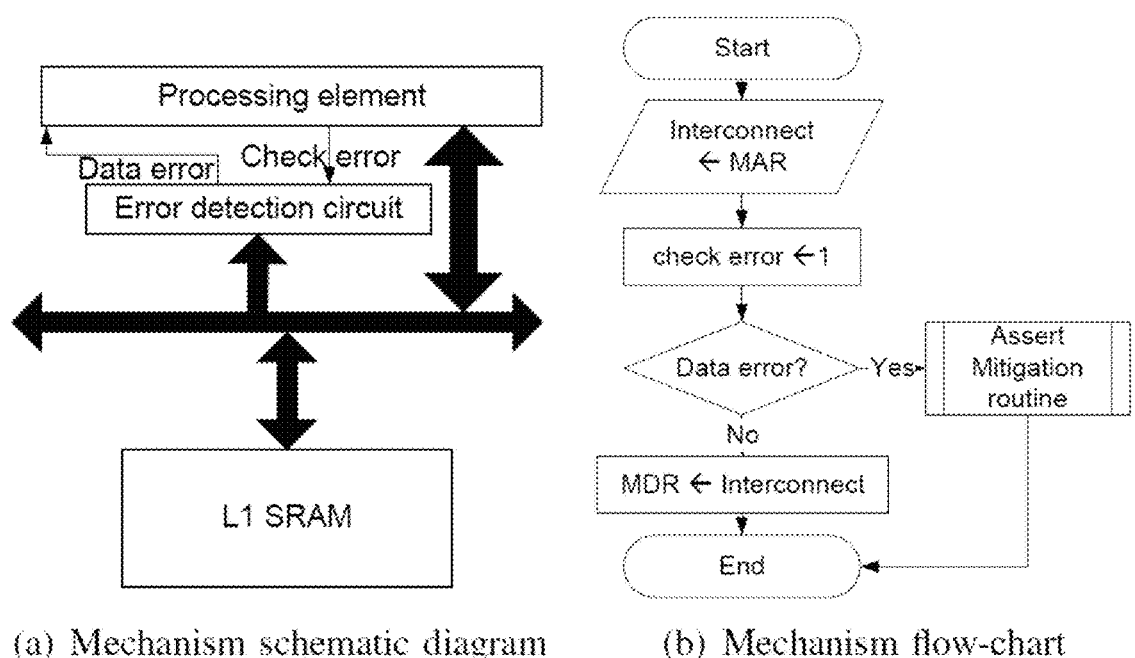
FIG. 10 represents an error detection mechanism that acts at each memory read transaction.

The error detection mechanism is a hybrid HW/SW based module that is designed to detect the error that may lead to data processing error. First a trigger-based error detection circuit with negligible overhead is added. This circuit is triggered with an enable signal, which is controlled using middleware routines. Thus, this circuit detects the error in a demand-driven fashion. FIG. 10(a) shows a schematic diagram example of the memory system with the error detection module. This module can be placed in different locations along L1 SRAMs and the processing element data route. For example, FIG. 10(a) shows that the error detection circuit is placed at the interconnection bus. In this way, the same physical module can be used to check for errors of read words from different memory modules. Other implementation techniques include directly integrating this circuit to the memory, or the processor data port.

FIG. 10(b) shows the detection flow implemented in this mechanism. In the proposed approach, the error detection mechanism is enabled when the memory address is issued from the memory address register (MAR). Before buffering the read data to the processor, the error detection circuit is triggered by asserting the error check signal. If the read data is faulty, the mitigation routine is triggered, which rollbacks the system to the latest committed checkpoint. If not, then the data is buffered to the memory data register (MDR) to be used by the processor. It is important to mention that there is no execution time delay due to this mechanism, since this detection is done within the memory access time.

The mitigation routine manages the rollback from a faulty memory access to a committed checkpoint. It can be implemented as a HW, SW or a hybrid routine. Moreover, this routine is triggered with different trigger knobs that exist both in HW and SW. The mitigation routine, shown in Algorithm 2, starts by triggering the transfer of the data chunk from the protected buffer to the L1 memory, while granting the read access of the processor to the protected buffer. Afterwards, this ISR restores the processor program counter (PC) with the committed checkpoint address and the processor pipeline is flushed to avoid any hazards in the system. When the processor restores from this routine, it executes the program segment that starts at the last committed checkpoint. Finally, once the chunk restoration is performed, the processor is granted the access to L1 memory.

---
Algorithm 2 Mitigation_routine( )
---
μDMA.transfer (L1', L1)
Proc. Read_source = L1'

---
Algorithm 2 Mitigation_routine( )
---
Proc.PC ← L1'.PC_buffer
Proc.pipeline.flush( )
if μDMA.transferred( ) then
   Proc.Read_source = L1
end if

---

The inclusion of checkpoints and division of data into chunks imply area, timing and energy overheads. First, the data chunk produced at a certain phase (CH(i)) consumes additional energy to be stored for a possible upcoming mitigation at the consequent phase (CH(i+1)). Second, checkpoints at the end of each computation phase add additional time and energy overheads to the execution time and energy consumption. This is related to the chunk sanity check performed to ensure the chunk is error-free, as well as the issuing order to migrate the data chunk to the protected memory buffer. Finally, if an error occurs, the system is penalized additional time and energy to recompute a faulty data chunk. In order to make the scheme energy, time, area efficient, an optimum chunk size, as well as optimum number of checkpoints, must be selected. The optimal selection of the aforementioned parameters is crucial to guarantee the time and area constraints and to minimize the additional cost introduced to the system, while maintaining error-free operation. First the energy, time and area overheads are quantified, that are used as optimization metrics in formulating the checkpoints and data chunk size selection as an optimization problem.

The energy overhead results from two operations: the checkpoint and the rollback procedures. This energy is identified into storage and computation costs, such that the storage energy ($E_{store}$) is introduced due to storing each data chunk in the introduced buffer at each checkpoint (CH(i)). The storage energy is computed as follows:

$$E_{store}=N_{CH}[S_{CH'}(E_{L1'}(S_{CH'},W)+E_{L1}(S_M,R))+E_{\mu DMA}]+ \\ \text{err}\cdot[S_{CH'}(E_{L1'}(S_{CH'},R)+E_{L1}(S_M,W))+E_{\mu DMA}] \quad (1)$$

where $N_{CH}$ is the number of checkpoints, $S_{CH}$ is the chunk size (in bytes), err is the expected number of chunks that will be faulty within a running task, $E_{L1'}(S_{CH}, Y)$ and $E_{L1}(S_M, Y)$ are the consumed energy in accessing (Y∈R, W) the protected buffer of size $S_{CH}$ and the L1 SRAM, respectively, and $E_{\mu DMA}$ is the consumed energy in the μDMA module. $E_{store}$ in (1) is simplified by assuming that the read and write energy consumption values are similar, as well as the μDMA energy is negligible. Thus, $E_{store}$ is rewritten as follows:

$$E_{store}=(N_{CH}+\text{err})\cdot S_{CH'}(E_{L1'}(S_{CH})+E_{L1}(S_M)) \quad (2)$$

The computation energy ($E_{comp}$) results from two items, the triggering of a checkpoint and the recomputation of a chunk of data to mitigate the runtime error. The computing energy cost is defined as follows:

$$E_{comp}=N_{CH}\cdot E_{CH}+\text{err}\cdot(E_{Mitig}+E(F(S_{CH}))) \quad (3)$$

where $E_{CH}$ is the additional energy consumed at each checkpoint due to the checkpoint routine, $E_{Mitig}$ is the energy consumed by the mitigation routine triggered when an error occurs, and $E(F(S_{CH}))$ is the energy consumed to recomputed a data chunk of size $S_{CH}$. It is worth mentioning that the chunk recomputation process is related to the size of the chunk, as well as the computing complexity of the program.

The introduced area overhead to the system is identified by the area of the protected buffer ($A_{L1'}(S_{CH})$), the area of the μDMA module ($A_{\mu DMA}$), and the additional interconnects ($A_{interconnect}$). The total area overhead $A_{ov}$ is defined as follows:

$$A_{ov} = A_{L1'}(S_{CH}) + A_{\mu DMA} + A_{interconnect} \quad (4)$$

In the imposed constraints the buffer area ($A_{L1'}(S_{CH})$) is related to the chunk size, as well as the targeted amount of correction bits. Thus, it is important to show the impact of the variation of chunk size and correction bits on the buffer overall area. For the correction codes one relies on Hamming codes, as it is the most widely known class of block codes. They are also optimal in required amount of redundancy.

Based on error correcting coding theory, for an information word of size n bits, the amount of m redundancy bits required to ensure the recovery of t errors must satisfy the inequality:

$$\sum_{i=0}^{t} \binom{n+m}{i} \le 2^m \quad (5)$$

By further simplification and for a large enough word length n observed in the target HW platforms (n>16), one can rewrite (5) as:

$$(n+m)^t \le 2^m \quad (6)$$

Inequality (6) shows that $A_{ov}$ is dominated by $A_{L1'}(S_{CH})$. Therefore, in the optimization only $A_{L1'}(S_{CH})$ is accounted for, while safely assuming that $A_{\mu DMA} + A_{interconnect}$ contribute to $A_{ov}$ by less than 10%.

An executed application encounters two primary sources of delays due to the mitigation approach, the delay due to the checkpoint routine $D_{CH}$ and the delay due to mitigation $D_{Mit}$, which is the delay in the mitigation routine and the delay in re-executing computation phase. These delays, as well as the total delays, are defined as follows:

$$D_{CH} = \frac{Inst_{checkpoint} \cdot CPI_{proc}}{f_{Proc}} + \frac{Mem_{checkpoint} \cdot CPM_{mem}}{f_{mem}} \quad (7)$$

$$D_{Mit} = D_{Mitig} + \frac{Inst_{CPavg} \cdot CPI_{proc}}{f'_{Proc}} + \frac{Mem_{CPavg} \cdot CPM_{mem}}{f_{mem'}} \quad (8)$$

$$D_{tot} = N_{CH} \cdot C_{CH} + err \cdot D_{Mit} \quad (9)$$

The delay due to the checkpoint routine is composed of the number of instructions and memory accesses of this routine (Algorithm 1), multiplied by the cycles per instruction (CPI) and the cycles per memory access (CPM). The delay is divided by the operating frequencies to get the delay in seconds. The mitigation delay is composed of the mitigation routine delay ($D_{Mitig}$) and computation phase re-execution. Since the occurrence of the error is not known in advance, worst-case error occurrence scenarios are used, where the error is at the end of a computation phase. The average instruction and memory access of computation phases ($Inst_{CPavg}$ and $Mem_{CPavg}$) is used as a representation of any computation phase. A correction vector ($\alpha^T$) can be added representing the deviation of different computation phases from the average case. However, this term is omitted here for simplicity. Moreover, the computation phases can be selected such that they experience delays with negligible variations from the average case.

It is important to note that we differentiate between the frequency used in normal operation ($f_{Proc}$, $f_{mem}$) and the frequency applied in mitigation ($f'_{Proc}$, $f'_{mem}$). Frequency scalability is enabled for systems with tight time constraint, which mitigation using normal operating frequency is not adequate. However, the system can increase its operating frequency, but with the cost of higher energy consumption.

It is crucial to minimize the aforementioned overheads for an efficient mitigation implementation. Thus, nonlinear programming is used for finding the optimum chunk size, number of checkpoints pair ($S^*_{CH}, N^*_{CH}$). The energy overhead is used as the cost function, while putting the area and time overheads as hard constraints. This is due to the fact that area overhead, as well as time in real-time systems, is more crucial than the energy consumption. Thus, the proposed technique has to guarantee that time and area overheads satisfy the acceptable values. In the problem formulation, we present the time and area overheads as inequality constraints as follows:

$$A_{L1'}(S_{CH}) \le OV_1 \cdot M \quad (10)$$

$$D_{tot} \le OV_2 \cdot Exec \quad (11)$$

Inequality 10 guarantees that the area overhead to implement the buffer of the optimum chunk size $A_{L1'}(S_{CH})$ is less than the affordable area overhead in the system $OV_1 \cdot M$, where M is the area of the system storage element, and $OV_1$ is the maximum area overhead percentage. In addition, inequality 11 guarantees that the cycle overhead required for error mitigation $D_{tot}$ is maintained within the allowed overhead of the program execution time $OV_2 \cdot Exec$, where $OV_2$ is the maximum time overhead percentage. Overall, the problem of finding the optimum chunk size $S_{CH}$ and number of checkpoints $N_{CH}$ can be formulated as follows:

$$\min_{(S_{CH}, N_{CH})} J = E_{store} + E_{comp} \quad (12)$$

$$A_{L1'}(S_{CH}) \le OV_1 \cdot M \quad (13)$$

Subject to $$D_{tot} \le OV_2 \cdot Exec \quad (14)$$

$$N_{CH} \in \mathbb{Z}^+ \quad (15)$$

$$S_C = F(N_{CH}, CFG_{prog}) \quad (16)$$

It is worth mentioning that the number of checkpoints and the data chunk size cannot be chosen arbitrarily, since they are dependent on each other. For example, a few number of checkpoints implies a large data chunk size, while a higher number of checkpoints implies a smaller data chunk.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/ distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of organizing on-chip data memory in an embedded system-on-chip platform whereon a deterministic application is run needing to meet at least one guaranteed constraint on its functional system behavior, the method comprising:
dividing the deterministic application into a plurality of blocks, each of the plurality of blocks corresponding to at least a part of a subtask of the deterministic application, at least one block of the plurality of blocks is an input block receiving input data, at least one block of the plurality of blocks is an output block generating output data, and each of the plurality of blocks comprising internal intermediate data for transforming the input data into the output data;
splitting the internal intermediate data into state data and non-state data, the state data depending on previous internal intermediate data and the non-state data not depending on previous internal intermediate data; and
putting the non-state data and at least a part of the state data in a protected buffering module being part of the data memory, the protected buffering module provided with a module for error detection and correction, so that they are available for mitigating the effect of faults on the functional system behavior on-line while meeting the at least one guaranteed constraint.

2. The method for organizing on-chip data memory as in claim 1, wherein the part of the state data at least comprises a portion of state data from which the other state data is derivable.

3. The method for organizing on-chip data memory as in claim 1, wherein the non-state data is split up in a plurality of data chunks.

4. The method for organizing on-chip data memory as in claim 1, wherein the module for detection is activated only when data is actively read by the deterministic application from the on-chip data memory.

5. The method for organizing on-chip data memory as in claim 4, further comprising detecting and correcting an error in a data segment put in the protected buffering module.

6. The method for organizing on-chip data memory as in claim 5, wherein the error correction is performed when the data segment comprising the error is processed again.

7. The method for organizing on-chip data memory as in claim 1, wherein the on-chip data memory further comprises a further memory part larger in storage size than the protected buffering module.

8. The method for organizing on-chip data memory as in claim 1, wherein the deterministic application is a streaming application.

9. The method for organizing on-chip data memory as in claim 1, wherein the on-chip data memory is SRAM memory.

10. The method for organizing on-chip data memory as in claim 1, wherein the blocks comprise a number of checkpoints to indicate termination of a computation phase inside the block, the number of checkpoints being determined by optimizing the energy overhead due to storage in the protected buffering module and recomputation with area and time overhead as constraints.

11. The method for organizing on-chip data memory as in claim 10, wherein the size of the chunks of non-state data is derived from the number of checkpoints.

12. The method for organizing on-chip data memory as in claim 10, wherein when an error is detected, application execution is resumed from the last checkpoint that successfully terminated a computation phase.

13. A method of buffering streaming data in a deterministic application running on an embedded system-on-chip platform, the deterministic application needing to meet at least one guaranteed constraint on its functional system behavior, the method comprising:
dividing the deterministic application into a plurality of blocks, each of the plurality of blocks corresponding to at least a part of a subtask of the deterministic application, at least one block of the plurality of blocks is an input block receiving input data, at least one block of the plurality of blocks is an output block generating output data, and each of the plurality of blocks comprising internal intermediate data for transforming the input data into the output data, the received input data and/or the generated output data and at least a part of the intermediate data forming the streaming data;
splitting at least the streaming data into data chunks, the size of the data chunks being selected so as to optimize the overhead cost of exploiting the splitting; and
storing the data chunks in the protected buffering module.

14. The method for buffering streaming data as in claim 13, wherein the data chunks have a size determined by optimizing the overhead cost due to storage in a protected buffering module and recomputation with area and time overhead as constraints.

15. The method for buffering streaming data as in claim 14, wherein the constraints are expressed as inequalities wherein area overhead and time overhead should not exceed a given allowed value.

16. The method for buffering streaming data as in claim 13, wherein the splitting into data chunks is performed at checkpoints inserted into the execution of the streaming application, the checkpoints each indicating the termination of a computation phase in the block, the number of the checkpoints being determined in accordance with the size of the data chunks.

17. The method for buffering streaming data as in claim 16, wherein on detection of an error, application execution is resumed from the last checkpoint that successfully terminated a computation phase.

18. An embedded system-on-chip platform comprising a hardware platform comprising:
a processor;
data memory; and
middleware arranged for running on the hardware platform in order to map on the hardware platform application software of a deterministic application needing to meet at least one guaranteed constraint on its functional system behavior,
the deterministic application being divided into a plurality of blocks, each of the plurality of blocks corresponding to at least a part of a subtask of the deterministic application, at least one block of the plurality of blocks is an input block receiving input data, at least one of the plurality of blocks is an output block generating output data, and each of the plurality of blocks comprising internal intermediate data for transforming the input data into the output data,
the internal intermediate data split into state data and non-state data, the state data depending on previous internal intermediate data and non-state data not-depending on previous internal intermediate data,
wherein the data memory comprises a protected buffering module and the hardware platform comprises an error detection and correction mechanism,
the hardware platform and the middleware further being adapted for putting the non-state data and at least a part of the state data in the protected buffering module, so that they are available for mitigating the effect of faults on the functional system behavior on-line while meeting the at least one guaranteed constraint.

19. The embedded system-on-chip platform as in claim 18, wherein the data memory comprises a plurality of hierarchical memory layers.

* * * * *

UNITED STATES PATENT AND TRADEMARK OFFICE
CERTIFICATE OF CORRECTION

PATENT NO. : 8,826,072 B2
APPLICATION NO. : 13/467758
DATED : September 2, 2014
INVENTOR(S) : Francky Catthoor It is certified that error appears in the above-identified patent and that said Letters Patent is hereby corrected as shown below:

On the Title Page, References Cited

In column 2 (page 1, item 56) at line 9, Under Other Publications, change "Perf.Comp." to --Perf. Comp.--.

In the Specification

In column 1 at line 51, Change "(HCl)," to --(HCl),--.
In column 2 at line 4, Change "(HCl)" to --(HCl)--.
In column 3 at line 17, Change "Perf.Comp." to --Perf. Comp.--.
In column 4 at line 58, Change "denote," to --denote--.
In column 4 at line 61, Change "[1,$N_i$;])" to --[1,$N_i$])--.
In column 12 at line 11, Change "L11" to --L1'--.
In column 14 at line 13, Change "buffet" to --buffer--.
In column 16 at line 62, Change "L1," to --L1--.
In column 18 at line 9 (approx.), Change "Can" to --can--.
In column 22 at line 16, Before "execution" insert --overall--.
In column 23 at line 45 (approx., Equation 9), Change "$C_{CH}$" to --$D_{CH}$--.
In column 24 at line 43 (approx., Equation 16), Change "$S_C$" to --$S_{CH}$--.

In the Claims

In column 27 at line 1, In Claim 18, change "not-depending" to --not depending--.

Signed and Sealed this
Ninth Day of June, 2015

Michelle K. Lee
*Director of the United States Patent and Trademark Office*